(12) United States Patent
Shibata et al.

(10) Patent No.: US 8,947,386 B2
(45) Date of Patent: Feb. 3, 2015

(54) ELECTRONIC INFORMATION TERMINAL DEVICE AND AREA SETTING CONTROL PROGRAM

(75) Inventors: Tetsuhiro Shibata, Sagamihara (JP); Tatsuya Eguchi, Toyohashi (JP); Tsutomu Suka, Fussa (JP); Keiichiro Hyodo, Kokubunji (JP); Masayuki Inoue, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 126 days.

(21) Appl. No.: 13/572,159

(22) Filed: Aug. 10, 2012

(65) Prior Publication Data
US 2013/0050111 A1 Feb. 28, 2013

(30) Foreign Application Priority Data
Aug. 25, 2011 (JP) .................................. 2011-184034

(51) Int. Cl.
G06F 3/041 (2006.01)
G06F 3/0488 (2013.01)
G06T 11/20 (2006.01)

(52) U.S. Cl.
CPC .......... G06F 3/04883 (2013.01); G06T 11/203 (2013.01); G06F 2203/04808 (2013.01)
USPC ...... 345/173; 345/174; 178/18.01; 178/18.06

(58) Field of Classification Search
CPC ................. G06F 2203/04808; G06F 3/04883; G06F 2203/04104; G06F 3/044; G06F 3/0488; G06T 11/203
USPC ...................... 345/173–178; 178/18.01–20.04
See application file for complete search history.

(56) References Cited

U.S. PATENT DOCUMENTS

| 2002/0036618 | A1 | 3/2002 | Wakai et al. |
| 2006/0017709 | A1* | 1/2006 | Okano .......................... 345/173 |
| 2008/0296073 | A1* | 12/2008 | McDermid ................ 178/18.05 |
| 2010/0141680 | A1 | 6/2010 | Nashida et al. |
| 2011/0169762 | A1* | 7/2011 | Weiss ............................. 345/173 |
| 2011/0298746 | A1* | 12/2011 | Hotelling ...................... 345/174 |
| 2012/0319977 | A1* | 12/2012 | Kuge ............................. 345/173 |

FOREIGN PATENT DOCUMENTS

| JP | 2001-290585 A | 10/2001 |
| JP | 2002-501271 A | 1/2002 |

(Continued)

OTHER PUBLICATIONS

Office Action (Notice of Reasons for Refusal) issued by the Japanese Patent Office on Oct. 22, 2013 in corresponding Japanese Patent Application No. 2011-184034 and an English translation of the Official Action. (6 pages).

*Primary Examiner* — Abbas Abdulselam
*Assistant Examiner* — Gerald Oliver
(74) *Attorney, Agent, or Firm* — Buchanan Ingersoll & Rooney PC

(57) ABSTRACT

Disclosed is an electronic information terminal device, which makes it possible to establish an area having an arbitral shape only by performing a simple action on a multi-touchable panel provided therewith. The device includes: a display section that is provided with a touch panel, which is capable of detecting two or more touched positions simultaneously; and an area setting control section that establishes an area based on a moving locus of a line segment connecting a plurality of touched positions, when at least one of the plurality of touched positions has moved, so as to make the display section display an image in which information residing within the area, above-established, is erased, or in which another information is added into the area above-established. The device is provided with an erasing operation mode for erasing a figure and a depicting operation mode for depicting another figure in a selectable manner.

14 Claims, 12 Drawing Sheets

(56) References Cited

FOREIGN PATENT DOCUMENTS

| JP | 2004-139411 A | 5/2004 |
|----|---------------|--------|
| JP | 2005-322088 A | 11/2005 |
| JP | 2009-122279 A | 6/2009 |
| JP | 2010-067126 A | 3/2010 |
| JP | 2011-022964 A | 2/2011 |
| WO | WO 99/38149 A1 | 7/1999 |

* cited by examiner

THIS FINGER IS FIXED

THIS FINGER IS FIXED

FIG. 7a
FIG. 7b
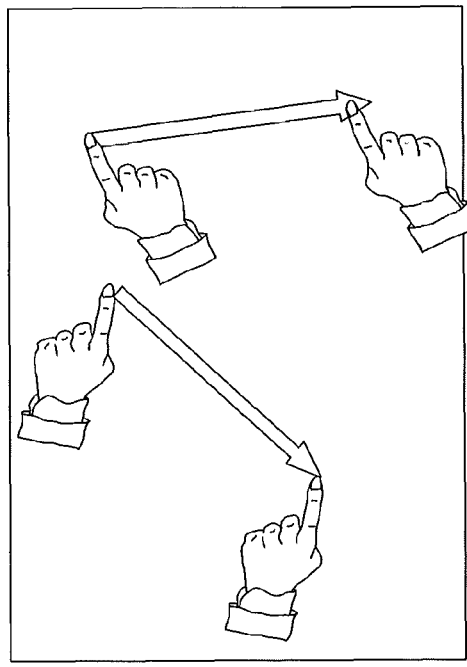
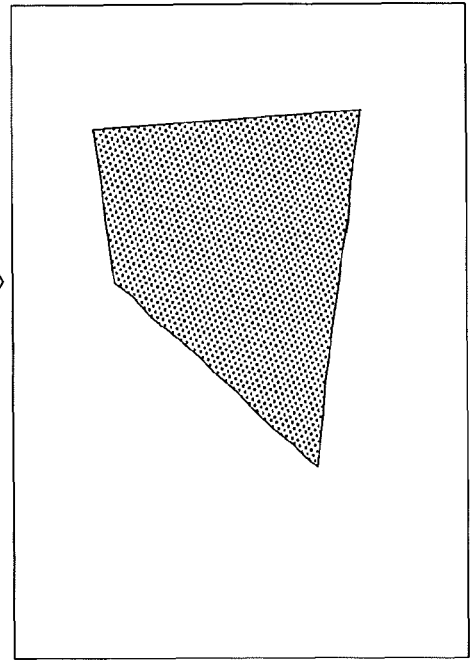

FIG. 8a
FIG. 8b
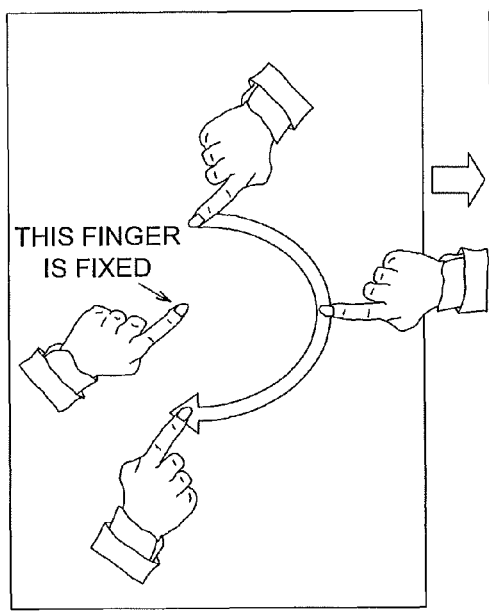
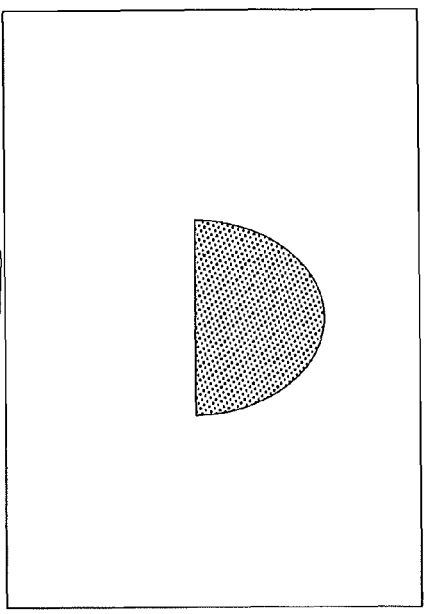
FIG. 9
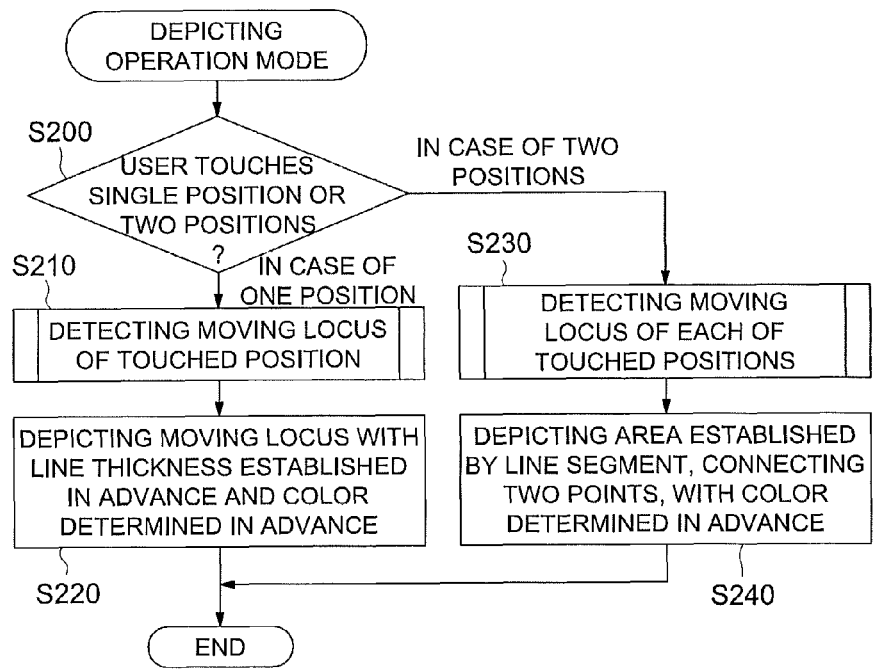

FIG. 10b  SINCE MOVING VELOCITY OF BRUSH AT OUTER SIDE AREA BECOMES FASTER THAN THAT AT INNER SIDE AREA, COLOR OF OUTER SIDE AREA BECOMES THINNER THAN THAT OF INNER SIDE AREA

BLEEDING AREA EMERGES
AS IF IT WERE RADIALLY
ENLARGED DEPENDING ON
STOPPING TIME

ELECTRONIC INFORMATION TERMINAL DEVICE AND AREA SETTING CONTROL PROGRAM

This application is based on Japanese Patent Application NO. 2011-184034 filed on Aug. 25, 2011, with the Japan Patent Office, the entire content of which is hereby incorporated by reference.

BACKGROUND OF THE INVENTION

The present invention relates to an electronic information terminal device and an area setting control program, and specifically relates to an electronic information terminal device that is provided with a touch panel and an area setting control program for controlling operations for establishing an area on the touch panel.

In recent years, there have been increasingly proliferated in the market various kinds of electronic information terminal devices, each of which is provided with a touch panel mounted over a display section, such as a smartphone, a tablet type terminal device, etc. This kind of electronic information terminal device makes it possible for the user to conduct various kinds of operations by making his finger touch onto the touch panel and/or slide on the touch panel. Specifically, an electronic information terminal device, provided with such a touch panel that is capable of detecting a user's multi touching operation (hereinafter, referred to as a multi-touchable touch panel), allows the user to conduct operations more complicated than ever, by employing two fingers for performing touch panel actions.

With respect to the multi-touchable touch panel abovementioned, for instance, Tokuhyo 2002-501271 (Japanese Patent Publication) sets forth a method for pursuing and detecting (identifying) a contact point of the user's hand in the consecutive near value images so as to support the operations for interpreting various kinds of configurations and actions in regard to typing actions, chordal actions of plural freedom degrees and handwriting actions, the method including the steps of dividing each of near value images into groups of electrodes indicating significant near values; extracting various kinds of parameters in regard to a total value of the near values, a position, a shape, a size and a direction from each of the electrode groups; pursuing a group of paths that pass through the continuous near value images, including the step of detecting a final path point from which the contact section lifts off after touched down; calculating a velocity vector and a filtering processed positional vector along each of the paths; allotting identities of user's hands and fingers to each of the contact section paths, by taking the relative path position and velocity, the feature of individual contact section and the previously estimated values of the positions of the hand and finger, into account; and maintaining the estimated values of the hand and finger based on the locus of the path currently allotted to the finger.

Further, with respect to the technology for depicting a figure by using the touch panel, for instance, Tokkai 2011-022964 (Japanese Patent Application Laid-Open Publication) sets forth a touch panel system that is provided with: a touch panel that is constituted by line electrodes and column electrodes, which are intersects with each other; a detecting section to detect a designated position and a moving path, both of which are performed on the touch panel by using a designation means, wherein, on the figure displayed on the touch panel concerned, the detecting section detects a designation start position designated by the designation means, a moving locus on which the designation means has moved from the designation start position, and a designation stop position at which the designation means stops moving; and a control section to deform the figure above-depicted, based on the information representing the designation start position, the moving locus and the designation stop position, which are detected by the detecting section.

When an area is to be established on the touch panel, employed is such a method that the user moves a single finger from a start point to a stop point in a diagonal direction so as to establish a rectangular area, the diagonal line of which is set as the line depicted from the start point to the stop point, or otherwise, the user moves two fingers so as to establish a rectangular area, the diagonal line of which is set as the line residing between the stop points of the two fingers. However, this method is merely employable for establishing a rectangular-shaped area, and therefore, this method has been inconvenient for the user, since it has been impossible to establish an area having an arbitral shape.

Further, as another method for establishing an area, employed is such a method that the user depicts a closed curved line with his single finger, so as to establish an area surrounded by the closed curved line. However, according to the abovementioned method, since it is impossible to make use of the multi touching function and it is impossible to speedily and simply establish the area concerned, this method has been also inconvenient for the user.

SUMMARY OF THE INVENTION

To overcome the abovementioned drawbacks in conventional electronic information terminal devices, it is one of objects of the present invention to provide an electronic information terminal device and an area setting control program, each of which makes it possible to establish an area having an arbitral shape only by performing a simple action on a multi-touchable panel provided therewith.

Accordingly, at least one of the objects of the present invention can be attained by any one of the electronic information terminal devices and the non-transitory computer readable storage medium described as follows.

(1) According to an electronic information terminal device reflecting an aspect of the present invention, the electronic information terminal device, comprises: a display section that is provided with a touch panel, which is capable of detecting two or more touched positions simultaneously; and an area setting control section that establishes an area based on a moving locus of a line segment connecting a plurality of touched positions, when at least one of the plurality of touched positions has moved, so as to make the display section display an image in which information residing within the area, above-established, is erased, or in which another information is added into the area above-established.

(2) According to another aspect of the present invention, in the electronic information terminal device recited in item 1, the electronic information terminal device is provided with an erasing operation mode for erasing a figure and a depicting operation mode for depicting another figure in a selectable manner; and, when the erasing operation mode is selected as a current operation mode of the electronic information terminal device, the area setting control section overwrites the area above-established, with a figure, allover which is painted with a solid color determined in advance, or erases another figure displayed within the area above-established.

(3) According to still another aspect of the present invention, in the electronic information terminal device recited in item 1, the electronic information terminal device is provided with an erasing operation mode for erasing a figure and a depicting operation mode for depicting another figure in a selectable manner; and, when the depicting operation mode is selected as a current operation mode of the electronic information terminal device, the area setting control section depicts a frame indicating a border of the area above-established, or paints allover the area above-established with a solid color determined in advance.

(4) According to still another aspect of the present invention, in the electronic information terminal device recited in item 3, when a curved bold line is depicted by moving the two touched positions, the area setting control section changes density of a color with which allover the curved bold line is painted, corresponding to a difference between moving velocities of the two touched positions, respectively forming an inner side line and an outer side line of the curved bold line.

(5) According to still another aspect of the present invention, in the electronic information terminal device recited in item 3, when the plurality of touched positions has stopped moving, the area setting control section expands the area in a vicinity of a position at which each of the touched positions has stopped moving, corresponding to a duration time of stopping each of the touched positions.

(6) According to still another aspect of the present invention, in the electronic information terminal device recited in item 5, the area setting control section changes a largeness of the area above-expanded and/or the density of the color with which the area above-expanded is to be painted, corresponding to the duration time of stopping each of the touched positions.

(7) According to a non-transitory computer readable storage medium reflecting yet another aspect of the present invention, the non-transitory computer readable storage medium stores a computer executable program for implementing an area setting controlling operation to be conducted in an electronic information terminal device that includes a display section provided with a touch panel, which is capable of detecting two or more touched positions simultaneously, the program being executable by a computer to cause the computer to perform a process comprising: establishing an area based on a moving locus of a line segment connecting a plurality of touched positions, when at least one of the plurality of touched positions has moved, so as to make the display section display an image in which information residing within the area, above-established, is erased, or in which another information is added into the area above-established.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 7a and FIG. 7b show schematic diagrams indicating area setting control operations (actions for depicting a figure) to be conducted on an electronic information terminal device embodied in the present invention;

FIG. 8a and FIG. 8b show schematic diagrams indicating area setting control operations (actions for depicting a figure) to be conducted on an electronic information terminal device embodied in the present invention as another example;

FIG. 9 shows a flowchart indicating an operational procedure of area setting control operations (actions for depicting a figure) that employs an electronic information terminal device embodied in the present invention;

FIG. 10a and FIG. 10b show schematic diagrams indicating area setting control operations (actions for changing density of a color, corresponding to a change of moving velocity) to be conducted on an electronic information terminal device embodied in the present invention;

DETAILED DESCRIPTION OF THE PREFERRED EMBODIMENT

As described in the "BACKGROUND OF THE INVENTION", when an area is to be established on the touch panel, conventionally employed is such the method that the user moves a single finger from a start point to a stop point in a diagonal direction so as to establish a rectangular area, the diagonal line of which is set as the line depicted from the start point to the stop point, or such the other method that the user moves two fingers so as to establish a rectangular area, the diagonal line of which is set as the line residing between the stop points of the two fingers, or such still the other method that the user depicts a closed curved line with his single finger, so as to establish an area surrounded by the closed curved line. However, the method for establishing a rectangular-shaped area cannot be employed for establishing an area having an arbitral shape, and the other method for depicting the closed curved line cannot be employed for making use of the multi touching function so as to speedily and simply establish the area concerned. Accordingly, every one of above-cited methods has been inconvenient for the user.

Specifically, since the operation for establishing an area becomes important at the time when a figure is depicted by using the touch panel, the abovementioned problems significantly emerge as inconvenience factors for the user.

Figure 15:
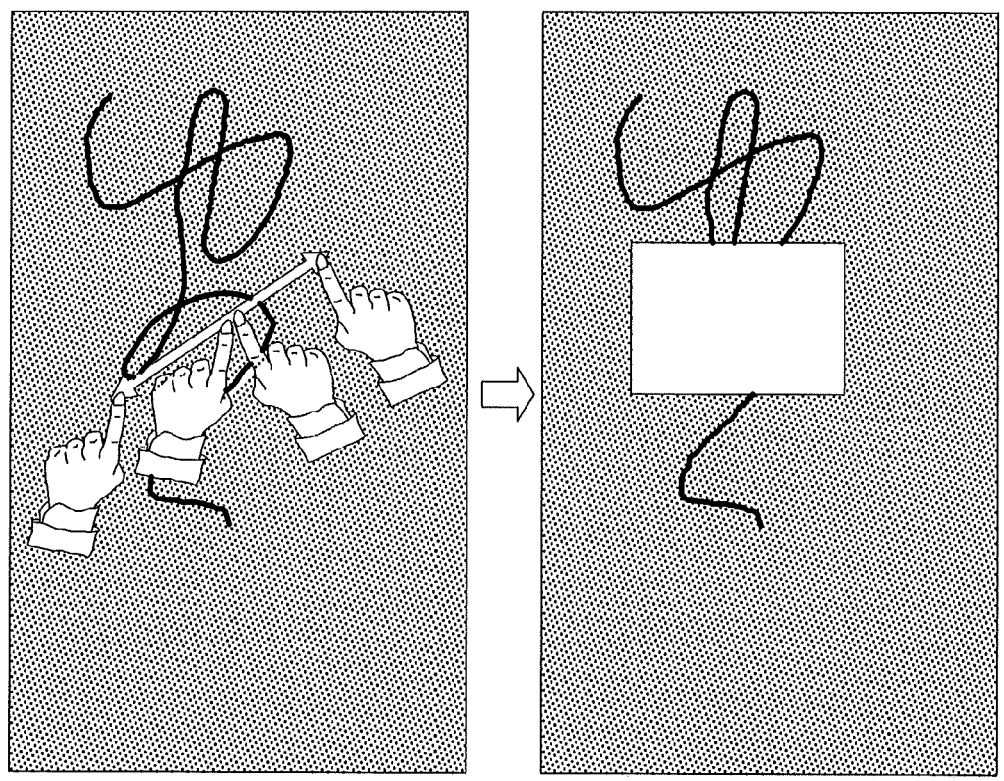
FIG. 15 shows an explanatory schematic diagram indicating an area setting control operation, which has been conventionally implemented.
Figure 16:
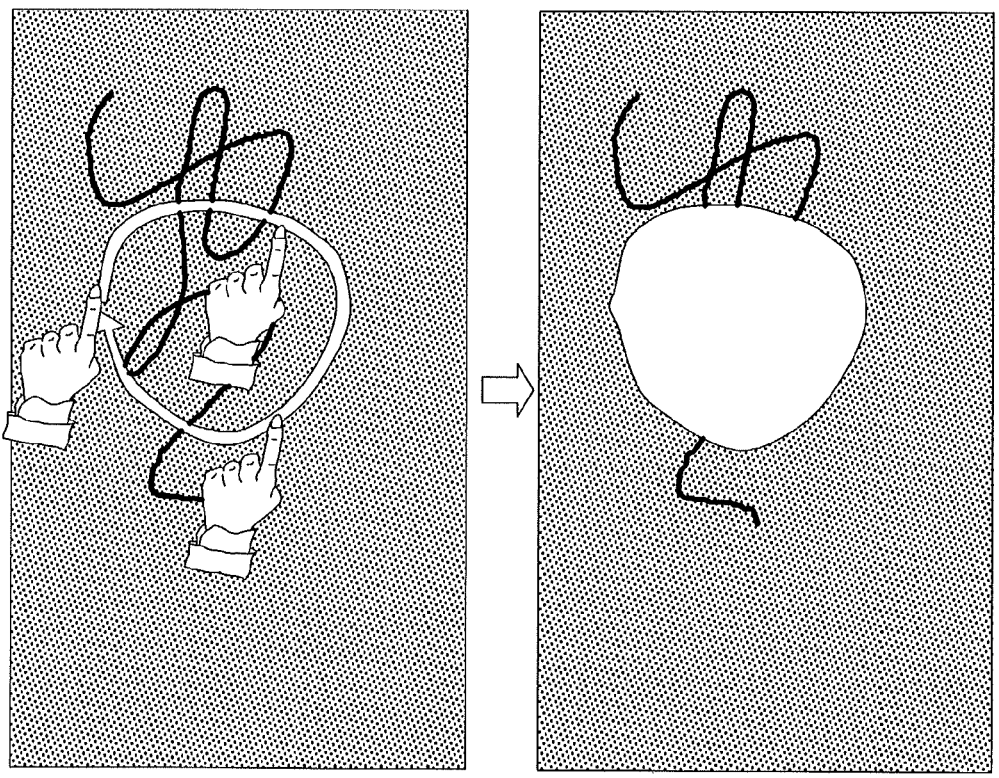
FIG. 16 shows an explanatory schematic diagram indicating another area setting control operation, which has been conventionally implemented.

For instance, when erasing a part of a figure, if the user could establish an area having an arbitral shape so as to erase a part of the figure depicted within the area established by the user, it would be convenient for the user. However, according to the conventional methods indicated in the schematic diagrams shown in FIG. 15 and FIG. 16, it is impossible to speedily and simply establish the area having the arbitral shape. Accordingly, when erasing a part of a figure, conventionally employed by the user has been such a method that the user selects a pen serving as an erasing rubber, and establishes the thickness of the pen so as to trace the line of the figure to be erased with the pen concerned. However, according to this conventional method, it is necessary to establish the thickness of the pen every time when erasing a part of a figure, and it takes considerable time for erasing a large-sized figure depicted over a wide area.

Further, by establishing an area, it may be possible for the user to depict a figure having an arbitral shape and/or a line having an arbitral thickness. However, according to the conventional methods indicated in the schematic diagrams shown in FIG. 15 and FIG. 16, it is impossible to speedily and simply establish the area having the arbitral shape. Accordingly, every time when depicting a figure, the user should select a figure having a predetermined shape and should establish a size of the figure in order to depict the figure concerned, resulting in inconvenience for the user. Still further, every time when depicting a line, the user should select a pen to be used for depicting the line and establish a thickness of the pen concerned in order to depict the line concerned, resulting in inconvenience for the user, as well.

To overcome the abovementioned problems inherent to the conventional methods, according to an embodiment of the present invention, in an electronic information terminal device that is provided with a multi-touchable touch panel, when plural positions residing within the multi-touchable touch panel are touched, and then, at least one of the touched positions is moved, an area is established on the basis of the moving locus of the line segments connecting the plural positions touched. Then, with respect to the area above-established, information included in the area concerned is erased, or new information is added to the area concerned so as to display the new information.

Accordingly, the electronic information terminal device, embodied in the present invention, makes it possible to establish an area only by performing a simple action on the multi-touchable touch panel, so as to conduct the information erasing/adding operations onto the area established. Specifically, by applying the abovementioned method to the operation for depicting a figure, it becomes possible for the user to partially erase the figure, to depict a figure having an arbitral shape and to depict a line having an arbitral shape, resulting in improvements of usability and convenience of the user.

Embodiment

Figure 1:
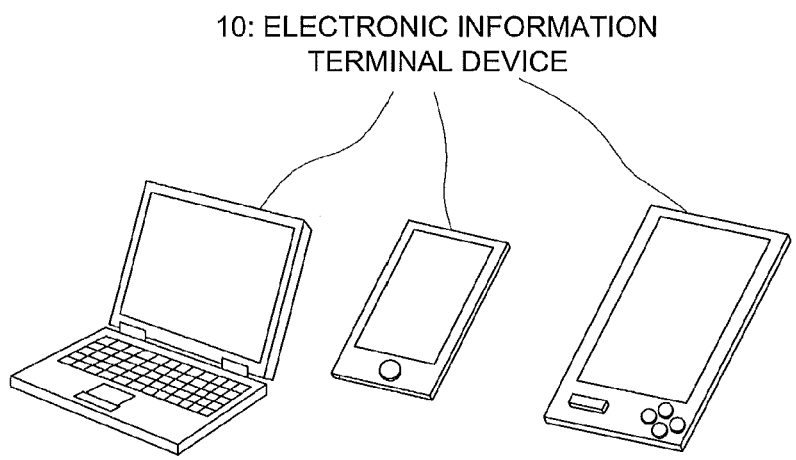
FIG. 1 shows a schematic diagram indicating an outer appearance of an electronic information terminal device, embodied in the present invention.
Figure 2:
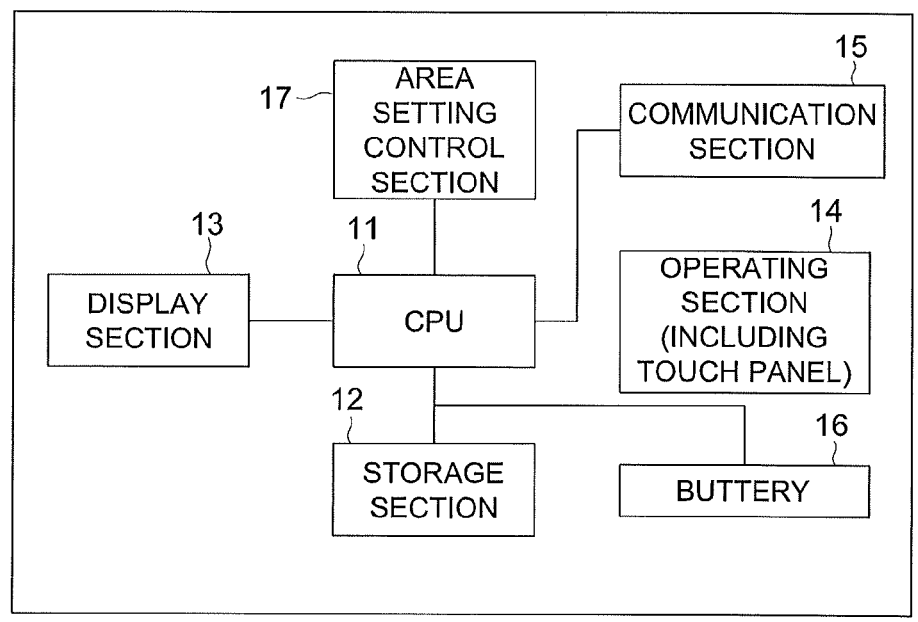
FIG. 2 shows a block diagram indicating a configuration of an electronic information terminal device embodied in the present invention.
Figure 10A:
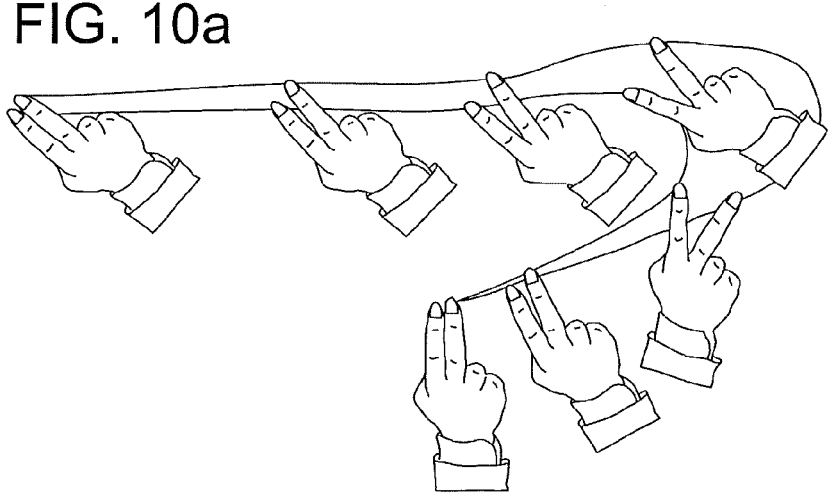
Figure 10A:
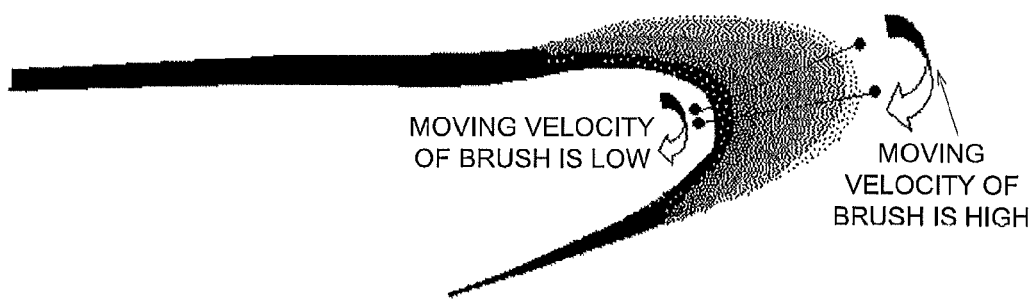
Figure 11:
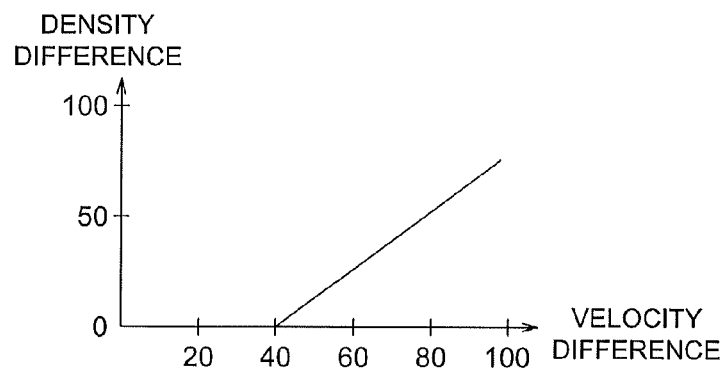
FIG. 11 shows an explanatory graph indicating relationship between velocity differences and density differences, when density is made to change corresponding to a change of moving velocity.
Figure 12A:
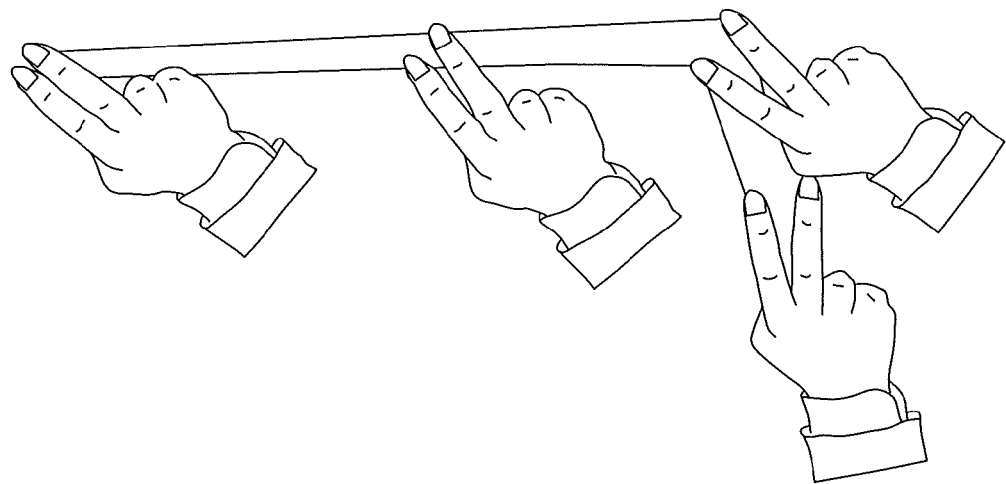
FIG. 12a and FIG. 12b show schematic diagrams indicating area setting control operations (actions for changing a bleeding area, corresponding to a stopping time) to be conducted on an electronic information terminal device embodied in the present invention.
Figure 12B:
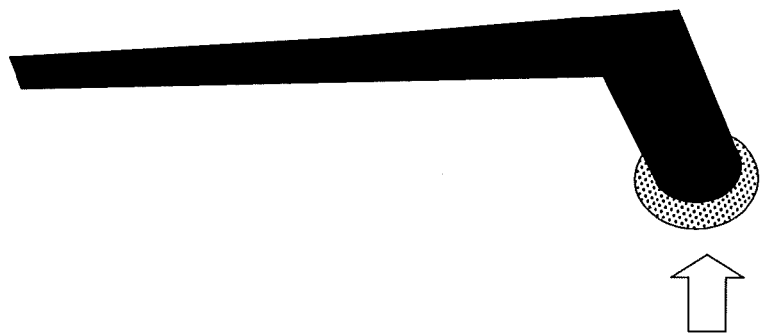
Figure 13:
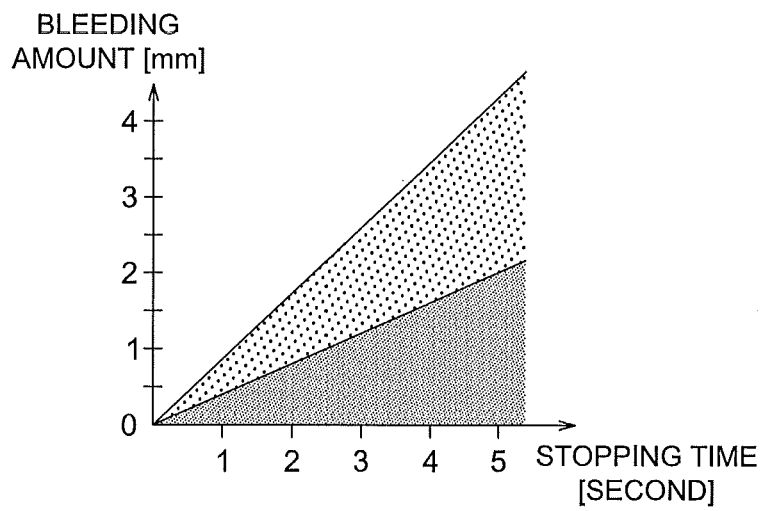
FIG. 13 show an explanatory graph indicating relationship between a stopping time and a bleeding amount.
Figure 14:
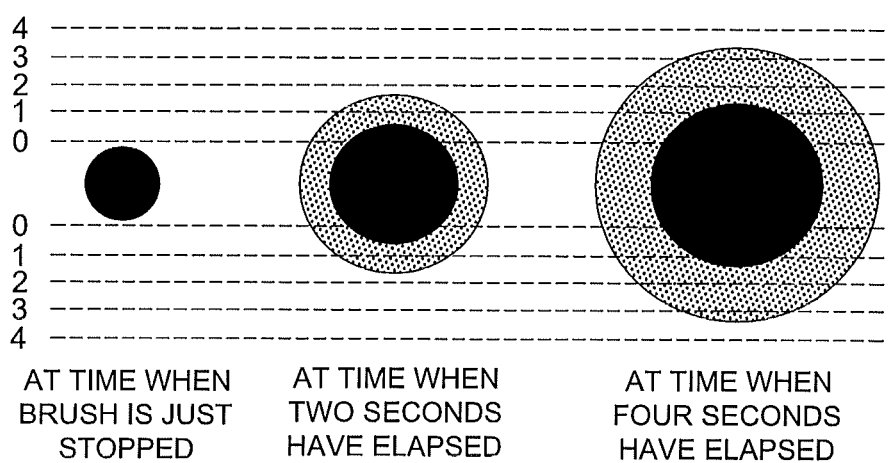
FIG. 14 shows an explanatory schematic diagram indicating a change of bleeding amounts, respectively corresponding to different stopping times.

In order to describe the preferred embodiment of the present invention in detail, referring to FIG. 1 through FIG. 14, an electronic information terminal device and an area setting control program, embodied in the present invention, will be detailed in the following. FIG. 1 shows a schematic diagram indicating an outer appearance of an electronic information terminal device, embodied in the present invention, FIG. 2 shows a block diagram indicating a configuration of the electronic information terminal device. Further, FIG. 3a through FIG. 5c show schematic diagrams indicating area setting control operations and FIG. 6 shows a flowchart indicating a flow of the area setting control operations, when information residing within the area concerned is to be erased. Still further, FIG. 7a through FIG. 8b show schematic diagrams indicating other area setting control operations and FIG. 9 shows a flowchart indicating a flow of the other area setting control operations, when a figure is to be depicted. Still further, FIG. 10a and FIG. 10b show explanatory schematic diagrams indicating still other area setting control operations and FIG. 11 shows an explanatory graph indicating relationship between velocity differences and density differences, when density is made to change corresponding to a change of moving velocity. Yet further, FIG. 12a and FIG. 12b show explanatory schematic diagrams indicating still other area setting control operations and FIG. 13 and FIG. 14 show explanatory graphs for explaining a change of bleeding amount, when the area is bled corresponding to an stop time interval.

In this connection, although the method of the present invention is applicable for overall operations for establishing an area onto the multi-touchable touch panel, such the case that the method of the present invention is specifically applied to the operations for erasing and depicting lines and figures will be detailed in the following.

As shown in FIG. 1, an electronic information terminal device 10, embodied in the present invention, is defined as such an apparatus that is provided with a displaying function, such as a note-type personal computer, a mobile-phone, a tablet type terminal device, etc. Further, as shown in FIG. 2, the electronic information terminal device 10 is constituted by a CPU (Central Processing Unit) 11, a storage section 12, a display section 13, an operating section (touch panel) 14, a communication section 15, a buttery 16, an area setting control section 17, etc.

The CPU 11 executes various kinds of programs read from the storage section 12, so as to serve as a control section to control various kinds of operations to be conducted in each of the sections. The electronic information terminal device 10, embodied in the present invention, is provided with two operation modes including an erasing operation mode and a depicting operation mode, and the control section controls the operations to be conducted in each of the sections, corresponding to one of the two operation modes, currently established in the electronic information terminal device 10 concerned.

The storage section 12 is constituted by a ROM (Read Only Memory), a RAM (Random Access Memory), etc., so as to store various kinds of programs to be executed by the CPU 11, setting information for controlling the operations to be conducted in the electronic information terminal device 10, various kinds of data (including data representing relationships between velocity differences and density differences, other data representing relationships between stop times and bleeding amounts, both detailed later), etc., therein.

The display section 13 is constituted by any one or any combination of an LCD (Liquid Crystal Display), an EL (Electroluminescence) display device, an EPD (Electrophoretic Display), etc., so as to display a line, a figure, etc., depicted by the user, thereon. In this connection, the EPD is so constituted that both black colored toner having an electro-conductive property, and white colored toner having an electro-insulation property, are enclosed into a gap formed between a pair of transparent film substrates, onto an inner surface of each of which a transparent and electro-conductive electrode are formed, so that, when a voltage is applied to the gap formed between the two transparent film substrates concerned, the black colored toner moves and switches positions with the white colored toner so as to change the total color thereof.

The operating section 14 is defined as a touch panel employing the electrostatic capacitance method, etc., in which transparent electrodes are arranged in a lattice pattern and which is disposed onto either the front surface or the rear surface of the display section 13, so as to transmit an electric signal outputted from a specific transparent electrode, onto which the user touches with his finger or the like, to the CPU 11 and the area setting control section 17. In this connection, the touch panel, which is to be employed for the present embodiment, is defined as the multi-touchable touch panel that is capable of simultaneously processing the signals outputted from the plural transparent electrodes at the same time (in other words, that is provided with the multi touching function, as it is called).

The communication section 15 is constituted by a NIC (Network Interface Card), a modem, etc., and communicates with a computerized apparatus and/or a server, which are coupled to each other through a network in either a wired or a wireless communication mode, so as to conduct data transmitting and receiving operations with them.

The buttery 16 serves as a secondary buttery, etc., which supplies an electric power to the various kinds of sections included in the electronic information terminal device 10.

The area setting control section 17 processes the signals outputted from the operating section (touch panel) 14, and, when plural positions residing within the multi-touchable touch panel are touched, and then, at least one of the touched positions is moved, the area setting control section 17 establishes an area on the basis of the moving locus of the line segments connecting the plural positions touched. For instance, when the user performs such an action that simultaneously moves the two touched positions, the area setting control section 17 establishes an area, which is surrounded by a line connecting the two initial positions touched at the time when starting the action, moving locus lines of the two touched positions and another line connecting the two final positions touched at the time when stopping the action, as a designated area. Otherwise, when the user performs such an action that moves only one of the two touched positions while the other one of the two touched positions is fixed, the area setting control section 17 establishes an area, which is surrounded by a line connecting the two initial positions touched at the time when starting the action, a moving locus line of the moved one of the two touched positions and another line connecting the two final positions touched at the time when stopping the action, as a designated area. Then, the area setting control section 17 erases the information (representing a figure, an image, a character, etc.) displayed within the designated area, when the erasing operation mode is established as the current operation mode, while, adds information to the designated area (in other words, displays a frame indicating the border of the designated area, or paints allover the designated area, etc.) so as to depict a line and/or a figure thereon, when the depicting operation mode is established as the current operation mode. Incidentally, it is applicable that the area setting control section 17 is configured as either, hardware or a program (area setting control program) to be executed by the CPU 11 (control section) so as to make the CPU 11 serve as the area setting control section 17.

In this connection, it is needless to say that the configuration of the electronic information terminal device 10, shown in FIG. 2, is exemplified as merely one of various kinds of embodiments of the present invention. Accordingly, the exemplified configuration can be modified by a skilled person without departing from the spirit and scope of the invention, as far as an area is settable based on plural touched positions on the touch panel, and the operations for erasing and/or adding information from/to the area concerned are possible.

Next, referring to the drawings, an area setting control method, embodied in the present invention, will be detailed in the following. Incidentally, although the method, embodied in the present invention, is also applicable for such a case that the user touches three or more points, only such a case that the user touches two points will be detailed in the following as the present embodiment, in order to simplify the contents of the explanations.

Initially, referring to the schematic diagrams shown in FIG. 3a through FIG. 5c and the flowchart shown in FIG. 6, the operation for erasing information residing within the area specified (operation to be conducted at the time of the erasing operation mode) will be detailed in the following.

Figure 3A:
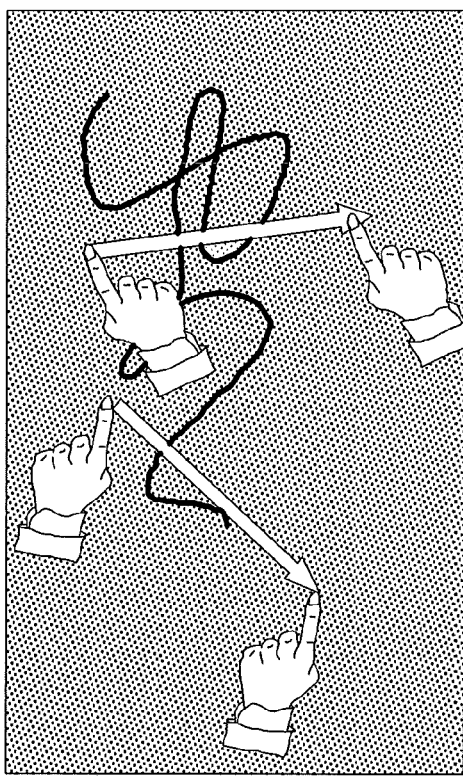
FIG. 3a, FIG. 3b and FIG. 3c show schematic diagrams indicating area setting control operations (actions for erasing information residing within an area established) to be conducted on an electronic information terminal device embodied in the present invention.
Figure 3B:
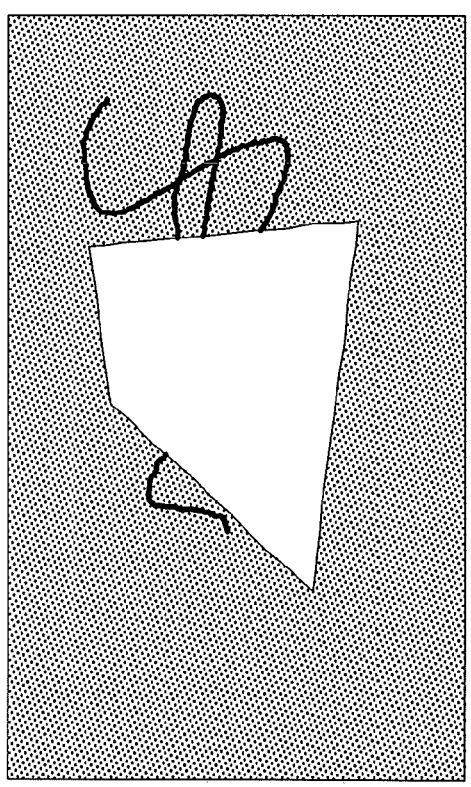
Figure 3B:
Figure 3C:
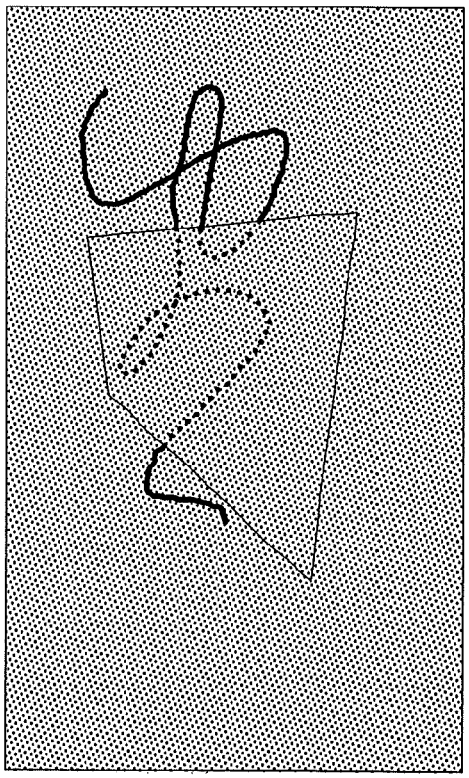

The schematic diagrams, shown in FIG. 3a through FIG. 3c, indicate the controlling operations to be conducted when two touched positions are made to move in such a state that a certain figure is currently displayed on the display section 13. At first, as shown in FIG. 3a, the user touches the touch panel with his two fingers so as to make each of the two fingers move linearly on the touch panel concerned. As a result of performing the abovementioned action, the area setting control section 17 conducts such the control operations to establish an area, based on the moving locus of the line segments connecting the two touched positions (in this case, to establish the area, which is surrounded by the line connecting the two positions touched at the operation start time point, the two lines, each indicating the moving locus of each of the two touched positions, and the other line connecting the two positions touched at the operation stop time point, as a designated area), and then, to implement the controlling operation for erasing a part of the figure, residing within the area designated by the user.

In this connection, as the method for erasing the figure residing within the area designated, either the method for overwriting a separate figure thereon, or the other method for erasing the figure itself therefrom, can be cited. The schematic diagram shown in FIG. 3b indicates the method for overwriting the separate figure thereon, and for instance, in this method, a figure formed by painting all over the established area with a constant color (herein, a white color) is overwritten thereon. On the other hand, the schematic diagram shown in FIG. 3c indicates the method for erasing the figure itself therefrom, and in this method, a part of the original figure, residing within the established area, is erased therefrom. Concretely speaking, the figure depicted on the display section 13 can be regarded as an aggregation of points, and a coordinate value is allotted to each of the points concerned. Accordingly, by sequentially deleting data representing each of the points, the coordinate values of which coincide with those of points residing within the established area, one by one, it is possible to erase only the part of the original figure, residing within the established area (indicated by broken lines shown in FIG. 3c).

Figure 4A:
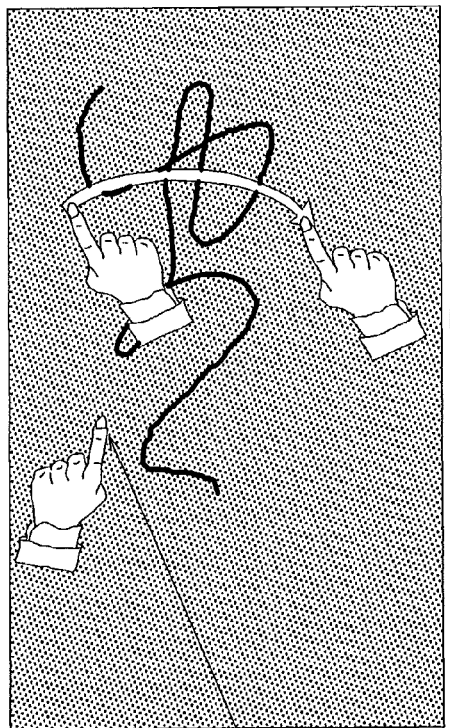
FIG. 4a and FIG. 4b show schematic diagrams indicating area setting control operations (actions for erasing information residing within an area established) to be conducted on an electronic information terminal device embodied in the present invention.
Figure 4B:
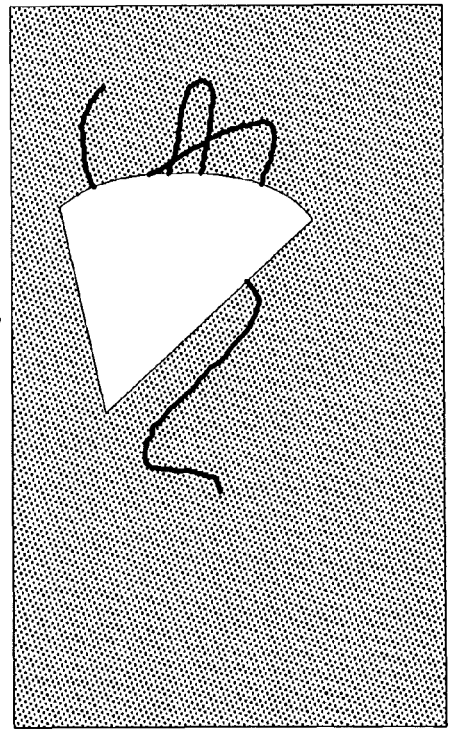

As well as shown in FIG. 3a through FIG. 3c, the schematic diagrams, shown in FIG. 4a and FIG. 4b, indicate the controlling operations to be conducted when a position touched by the first finger is fixed, while anther position touched by the second finger is made to move in such a state that a certain figure is currently displayed on the display section 13. As shown in FIG. 4*a*, the user touches the touch panel with his two fingers, including the first finger and the second finger, so as to make the second fingers move freely on the touch panel concerned. As a result of performing the above-mentioned action, the area setting control section 17 conducts such the control operations to establish an area, based on the moving locus of the line segments connecting the two touched positions (in this case, to establish the area, which is surrounded by the line connecting the two positions touched at the operation start time point, the other line indicating the moving locus of the position touched by the second finger, and still the other line connecting the two positions touched at the operation stop time point, as a designated area), and then, to implement the controlling operation for erasing a part of the figure, residing within the area designated by the user.

Figure 5A:
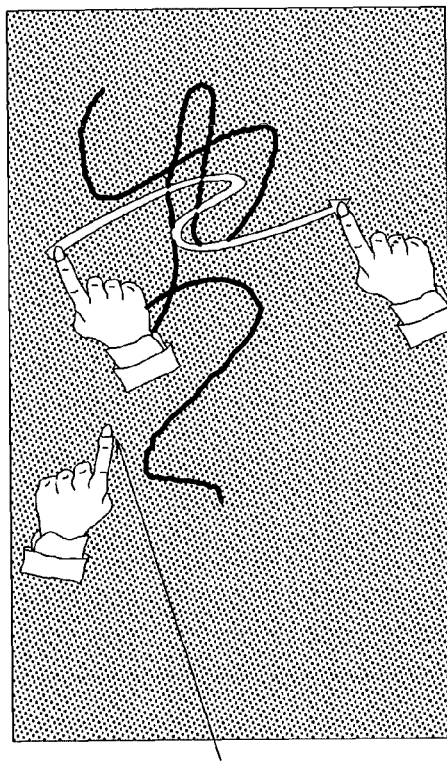
FIG. 5a, FIG. 5b and FIG. 5c show schematic diagrams indicating area setting control operations (actions for erasing information residing within an area established) to be conducted on an electronic information terminal device embodied in the present invention as another example.
Figure 5B:
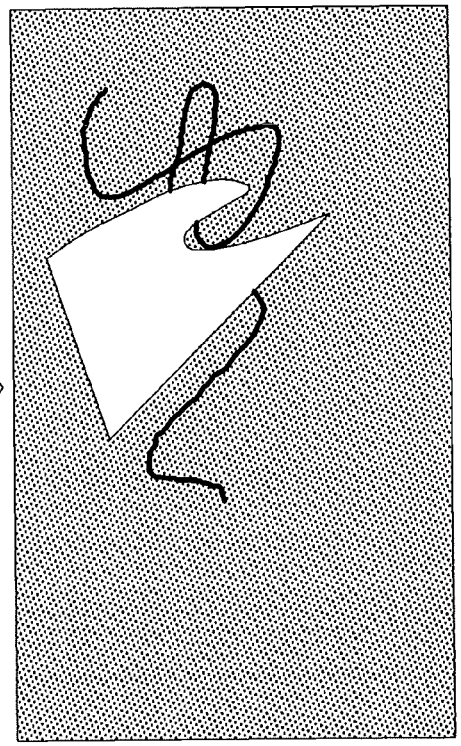
Figure 5C:
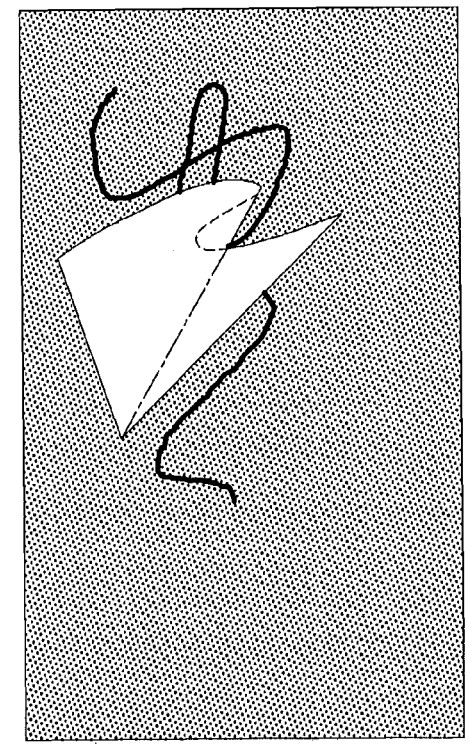
Figure 6:
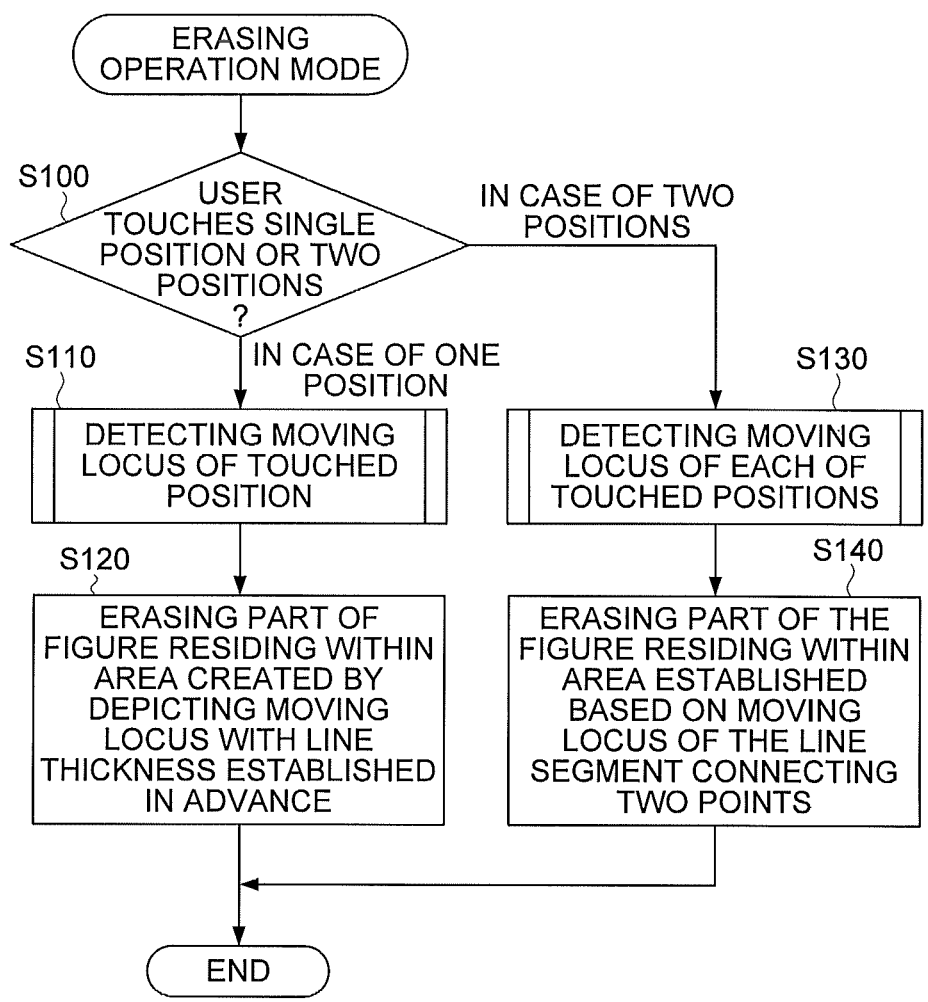
FIG. 6 shows a flowchart indicating an operational procedure of area setting control operations (actions for erasing information residing within an area established) that employs an electronic information terminal device embodied in the present invention.

As well as shown in FIG. 4*a* and FIG. 4*b*, the schematic diagrams, shown in FIG. 5*a* through FIG. 5*c*, indicate the controlling operations to be conducted when a position touched by the first finger is fixed, while anther position touched by the second finger is made to move in such a state that a certain figure is currently displayed on the display section 13. As shown in FIG. 5*a*, the user touches the touch panel with his two fingers, including the first finger and the second finger, so as to make the second fingers move forward and backward on the touch panel concerned. As shown in FIG. 5*a*, in such a case that, viewing from the position touched by the first finger, the position touched by the second finger moves forward in a predetermined direction (right direction in the schematic diagram shown in FIG. 5*a*), and then, further moves backward in a direction opposite to the predetermined direction (right direction in the schematic diagram shown in FIG. 5*a*), and then, still further moves forward in the predetermined direction, there exit two different methods for establishing an area concerned, including a first method and a second method.

As aforementioned and as shown in FIG. 5*b*, according to the first method, the area, which is surrounded by the line connecting the two positions touched at the operation start time point, the other line indicating the moving locus of the position touched by the second finger, and still the other line connecting the two positions touched at the operation stop time point, is specified as a designated area. On the other hand, as shown in FIG. 5*c*, according to the second method, the area, which is created by the line connecting the two positions touched at each of the times, is specified as a designated area. In this case, an area surrounded by the broken line is added to the area shown in FIG. 5*b*. It is settable for the user to employ any one of the two methods for setting the area concerned.

Referring to the flowchart shown in FIG. 6, the flow of operations according to the two methods abovementioned will be detailed in the following.

Initially, the user operates the operating section 14 so as to establish the current operation mode of the electronic information terminal device 10 at the erasing operation mode. Then, when the user touches the touch panel, the area setting control section 17 determines whether the user touches a single position or two positions on the touch panel, based on the signals outputted by the operating section (touch panel) 14 (Step S100). When determining that the user touches a single position, the area setting control section 17 detects the moving locus of the touched position concerned (Step S110), and establishes an area created by depicting the moving locus with the line thickness established in advance, so as to erase a part of the figure residing within the area concerned (Step S120), as well as the conventional operations.

On the other hand, when determining that the user touches two positions, the area setting control section 17 detects the moving locus of each of the touched points (Step S130), and establishes an area based on the moving locus of the line segment connecting the two points, so as to erase a part of the figure residing within the area concerned (Step S140).

As abovementioned, by touching the two points and by making the touched points move, it becomes possible for the user to speedily establish an area in an easy operating way, and accordingly, it becomes possible for the user to erase an arbitral part of the figure concerned.

Next, referring to the schematic diagrams shown in FIG. 7*a* through FIG. 8*b* and the flowchart shown in FIG. 9, the operation for depicting a figure (operation to be conducted at the time of the depicting operation mode) will be detailed in the following.

At first, as shown in FIG. 7*a*, the user touches the touch panel with his two fingers so as to make each of the two fingers move linearly on the touch panel concerned. As shown in FIG. 7*b*, as a result of performing the abovementioned action, the area setting control section 17 conducts such the control operations to establish an area, based on the moving locus of the line segments connecting the two touched positions (in this case, to establish the area, which is surrounded by the line connecting the two positions touched at the operation start time point, the two lines, each indicating the moving locus of each of the two touched positions, and the other line connecting the two positions touched at the operation stop time point, as a designated area), and then, to depict the frame indicating the border of the above-established area and to paint allover the above-established area with a color determined in advance, so as to depict the figure concerned.

Further, as shown in FIG. 8*a*, the user touches the touch panel with his two fingers, including the first finger and the second finger, so as to make the second fingers move arbitrarily on the touch panel concerned. As a result of performing the abovementioned action, as shown in FIG. 8*b*, the area setting control section 17 conducts such the control operations to establish an area, based on the moving locus of the line segments connecting the two touched positions (in this case, to establish the area, which is surrounded by the line connecting the two positions touched at the operation start time point, the other line indicating the moving locus of the position touched by the second forger, and still the other line connecting the two positions touched at the operation stop time point, as a designated area), and then, to depict the frame indicating the border of the above-established area and to paint allover the above-established area with a color determined in advance, so as to depict the figure concerned.

Referring to the flowchart shown in FIG. 9, the flow of operations according to the method abovementioned will be detailed in the following.

Initially, the user operates the operating section 14 so as to establish the current operation mode of the electronic information terminal device 10 at the depicting operation mode. Then, when the user touches the touch panel, the area setting control section 17 determines whether the user touches a single position or two positions on the touch panel, based on the signals outputted by the operating section (touch panel) 14 (Step S200). When determining that the user touches a single position, the area setting control section 17 detects the moving locus of the touched position concerned (Step S210), and paints the moving locus with a line thickness established in advance and a color determined in advance, so as to depict the figure concerned (Step S220), as well as the conventional operations.

On the other hand, when determining that the user touches two positions, the area setting control section 17 detects the moving locus of each of the touched points (Step S230), and establishes an area based on the moving locus of the line segment connecting the tow points, and then, depicts the frame indicating the border of the above-established area and paints allover the above-established area with a color determined in advance, so as to depict the figure concerned (Step S240).

As abovementioned, by touching the two points and by making the touched points move, it becomes possible for the user to speedily establish an area in an easy operating way, and accordingly, it becomes possible for the user to depict a figure having an arbitral shape.

Although the methods for depicting a figure, such as a polygonal shaped figure, a semicircular shaped figure, etc., have been described in the foregoing, while referring to the schematic diagrams and the flowchart shown in FIG. 7a through FIG. 9, it is also possible for the user to depict a kind of line with his two fingers. For instance, as shown in FIG. 10a, when the user puts his two fingers onto the touch panel, and then, simultaneously moves the two fingers while changing the interval distance between the two fingers so as to depict a curved bold line, it becomes possible for the user to establish an area based on the moving locus of the line segment connecting the tow point currently touched by his two finger, and by depicting a frame line indicating the border of the area concerned and by painting allover the area with a color determined in advance, it becomes possible for the user to depict a bold line, a width of which is freely changed.

Incidentally, when a curved bold line is depicted by using a brush soaked in sumi (Japanese solid ink), since the moving velocity of the brush at the outer side area of the curved bold line becomes faster than that at the inner side area, the color of the outer side area becomes more blurred and thinner than that of the inner side area. Accordingly, in order to make it possible to represent the bold line as if it were written by using the brush soaked in sumi, it is also possible to change the color density of the area corresponding to the moving velocity of the touched position as shown in FIG. 10b (deep color at the low velocity portion, while light color at the high velocity portion).

In the above case, the data representing the relationship between the density difference and the moving velocity difference of the touched positions, as shown in FIG. 11, is stored in the storage section 12, etc., in advance, so that, when the bold line is depicted by using the tow fingers, the area setting control section 17 acquires the moving velocity difference of the touched positions so as to make it possible to establish the density of the color based on the relationship shown in FIG. 11.

Further, in the case that a bold line is depicted by using the brush soaked in sumi, when the brush is made to stop at a stopping position, the sumi oozes from the stopping position so as to generate a bleeding area around it. Accordingly, when the bold line is depicted by moving the two fingers as shown in FIG. 12a, it is also possible to change the size of the bleeding area corresponding to the stopping time of the touched position as shown in FIG. 12b, so as to represent the bold line as if it were written by using the brush soaked in sumi.

FIG. 13 shows a graph of data indicating a relationship between the stopping time and the bleeding amount, while FIG. 14 shows a schematic diagram indicating the abovementioned relationship. When the bold line is depicted by moving the two fingers, by changing the bleeding amount based on the relationship shown in FIG. 13, it is possible to depict a bold line, which is similar to that actually depicted by the brush more than ever.

As described in the foregoing, according to the electronic information terminal device (or the area setting control program) embodied in the present invention, when plural positions on the touch panel are touched and an operation for moving at least one of the plural positions is performed, since the controlling operations for establishing an area based on the moving locus of the line segment connecting the plural positions, erasing information displayed within the above-established area, and/or adding information into the above-established area, are conducted, it becomes possible for the user to erase the figure, to depict a figure, to draw a line, etc., as desired by the user, only by performing an easy operation.

In this connection, the scope of the present invention is not limited to the embodiments described in the foregoing. Modifications and additions made by a skilled person without departing from the spirit and scope of the invention shall be included in the scope of the present invention.

For instance, although the controlling operations to be conducted in the embodiments described in the foregoing have been applied to such the cases that the user touches two points, it is needless to say that the controlling operations, embodied in the present invention, can be applied to such a case that the user touches three or more points, as well. For instance, when the user touches three or more points, it is possible to establish an area based on line segments, each of which is formed by connecting any two points among the three or more points, or based on a moving locus of an area created by connecting the three or more points.

Further, although the controlling operations for erasing or depicting the figure have been described in the foregoing as the embodiments of the present invention, the present invention is also applicable for such a case, as well, that characters, displayed within a predetermined area, is to be erased, and/or characters are added to the predetermined area so as to display the characters thereon, in the state that the document concerned is currently displayed.

The present invention is available for an apparatus that is provided with a display section including a touch panel and a program to be executed in the apparatus concerned.

According to an electronic information terminal device and/or an area setting control program embodied in the present invention, it becomes possible for the user to established an area having an arbitral shape only by performing a simple action on the multi-touchable panel.

This is because, when the user simultaneously touches a plurality of positions and moves at least one of the plurality of positions, the electronic information terminal device (area setting control program) establishes an area based on the moving locus of the line segment connecting the plural touched positions with each other, and conducts controlling operations for either erasing information residing within the area above-established, or adding information into the area above-established.

Further, by applying the abovementioned controlling operations to an operation for depicting a figure, it becomes possible for the user to easily erase a figure in a desirable manner or to depict a figure in an easy way.

While the preferred embodiments of the present invention have been described using specific term, such description is for illustrative purpose only, and it is to be understood that changes and variations may be made without departing from the spirit and scope of the appended claims.

What is claimed is:

1. An electronic information terminal device, comprising:
 a display section that is provided with a display screen to display an image thereon and a touch panel, wherein the touch panel is mounted over the display screen and is capable of simultaneously detecting two or more touched positions respectively touched by two or more touching objects, the two or more touched positions being separated by a line segment; and
 an area setting control section that establishes an area formed by moving at least one of the two or more touched positions on the display section, such that the line segment traverses a portion of the display section, wherein the area corresponds to the portion of the display section traversed by the line segment, so as to make the display section display an image in which information residing within the area, above-established, is erased, or in which another information is added into the area above-established.

2. The electronic information terminal device of claim 1,
 wherein the electronic information terminal device is provided with an erasing operation mode for erasing a figure and a depicting operation mode for depicting another figure in a selectable manner; and
 wherein, when the erasing operation mode is selected as a current operation mode of the electronic information terminal device, the area setting control section overwrites the area above-established, with a figure, allover which is painted with a solid color determined in advance, or erases another figure displayed within the area above-established.

3. The electronic information terminal device of claim 1,
 wherein the electronic information terminal device is provided with an erasing operation mode for erasing a figure and a depicting operation mode for depicting another figure in a selectable manner; and
 wherein, when the depicting operation mode is selected as a current operation mode of the electronic information terminal device, the area setting control section depicts a frame indicating a border of the area above-established, or paints allover the area above-established with a solid color determined in advance.

4. The electronic information terminal device of claim 3,
 wherein, when a curved bold line is depicted by moving the two or more touched positions, the area setting control section changes density of a color with which allover the curved bold line is painted, corresponding to a difference between moving velocities of the two or more touched positions, respectively forming an inner side line and an outer side line of the curved bold line.

5. The electronic information terminal device of claim 3,
 wherein, when the two or more touched positions has stopped moving, the area setting control section expands the area in a vicinity of a position at which each of the two or more touched positions has stopped moving, corresponding to a duration time of stopping each of the two or more touched positions.

6. The electronic information terminal device of claim 5,
 wherein the area setting control section changes a largeness of the area above-expanded and/or the density of the color with which the area above-expanded is to be painted, corresponding to the duration time of stopping each of the two or more touched positions.

7. The electronic information terminal device of claim 1,
wherein the at least one of the two or more touched positions are moved on the display section by moving, while touching the display section, at least one of the two or more touching objects touching the at least one of the two or more touched positions.

8. A non-transitory computer readable storage medium storing a computer executable program for implementing an area setting controlling operation to be conducted in an electronic information terminal device that includes a display section provided with a display screen to display an image thereon and a touch panel, wherein the touch panel is mounted over the display screen and is capable of simultaneously detecting two or more touched positions respectively touched by two or more touching objects, the two or more touched positions being separated by a line segment, the program being executable by a computer to cause the computer to perform a process comprising:
 establishing an area formed by moving at least one of the two or more touched positions on the display section, such that the line segment traverses a portion of the display section, wherein the area corresponds to the portion of the display section traversed by the line segment, so as to make the display section display an image in which information residing within the area, above-established, is erased, or in which another information is added into the area above-established.

9. The non-transitory computer readable storage medium of claim 8,
 wherein the electronic information terminal device is provided with an erasing operation mode for erasing a figure and a depicting operation mode for depicting another figure in a selectable manner; and
 wherein, when the erasing operation mode is selected as a current operation mode of the electronic information terminal device, the area above-established is overwritten with a figure, allover which is painted with a solid color determined in advance, or another figure, displayed within the area above-established, is erased.

10. The non-transitory computer readable storage medium of claim 8,
 wherein the electronic information terminal device is provided with an erasing operation mode for erasing a figure and a depicting operation mode for depicting another figure in a selectable manner; and
 wherein, when the depicting operation mode is selected as a current operation mode of the electronic information terminal device, a frame, indicating a border of the area above-established, is depicted, or allover the area above-established is painted with a solid color determined in advance.

11. The non-transitory computer readable storage medium of claim 10,
 wherein, when a curved bold line is depicted by moving the two or more touched positions, density of a color, with which allover the curved bold line is painted, is made to change, corresponding to a difference between moving velocities of the two or more touched positions, respectively forming an inner side line and an outer side line of the curved bold line.

12. The non-transitory computer readable storage medium of claim 8,
 wherein, when the two or more touched positions has stopped moving, the area, in a vicinity of a position at which each of the two or more touched positions has stopped moving, is expanded, corresponding to a duration time of stopping each of the two or more touched positions.

13. The non-transitory computer readable storage medium of claim 12,
   wherein a largeness of the area above-expanded and/or the density of the color with which the area above-expanded is to be painted, is made to change, corresponding to the duration time of stopping each of the two or more touched positions.

14. The non-transitory computer readable storage medium of claim 8, wherein the at least one of the two or more touched positions are moved on the display section by moving, while touching the display section, at least one of the two or more touching objects touching the at least one of the two or more touched positions.

* * * * *